(No Model.)
H. B. TRICKLER.
BICYCLE DRIVING AND STEERING MECHANISM.
No. 585,370. Patented June 29, 1897.
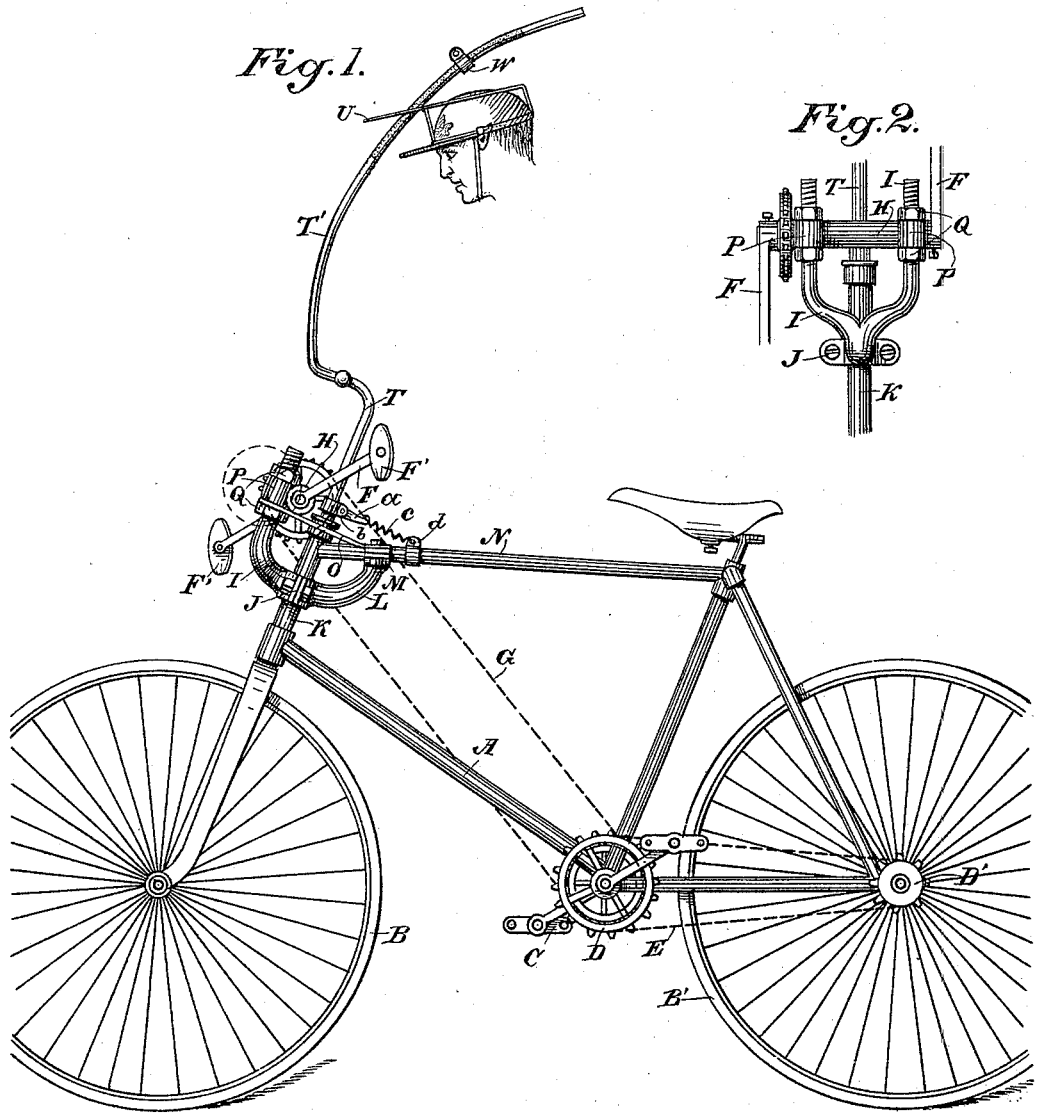
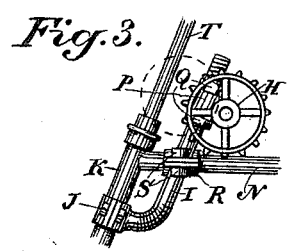
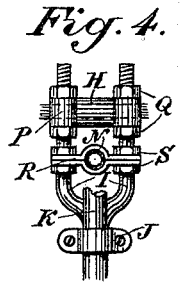
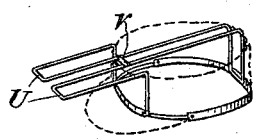
Witnesses,
Inventor,
Henry B. Trickler
By Dewey & Co.
Attys

UNITED STATES PATENT OFFICE.

HENRY B. TRICKLER, OF ALBION, CALIFORNIA.

BICYCLE DRIVING AND STEERING MECHANISM.

SPECIFICATION forming part of Letters Patent No. 585,370, dated June 29, 1897.

Application filed June 24, 1896. Serial No. 596,732. (No model.)

*To all whom it may concern:*

Be it known that I, HENRY B. TRICKLER, a citizen of the United States, residing at Albion, county of Mendocino, State of California, have invented an Improvement in Bicycle Driving and Steering; and I hereby declare the following to be a full, clear, and exact description of the same.

My invention relates to certain improvements in bicycles; and it consists of the parts and the constructions and combinations of parts hereinafter described and claimed.

Figure 1 is a view of my improved bicycle. Fig. 2 is a front view of the hand driving device. Fig. 3 shows the hand driving device back of the steering-head. Fig. 4 is a front view of the same. Fig. 5 shows the arrangement on the cap for head-steering.

A is the frame of a bicycle, which is here shown of a diamond pattern. It may be any suitable form or construction and has the front and rear wheels B and B', the driving-cranks C, sprocket-wheels D and D', and driving-chain E, by which power is transmitted from the cranks C to the rear wheel.

In order to apply the power of the arms as well as that of the legs, I have shown a second set of cranks F, the crank-shaft of which is journaled in a yoke or frame attached to the head of the bicycle by means of a supplemental sprocket-wheel on the main crank-shaft and the sprocket-wheel upon the hand-crank shaft and a chain G extending between them. The power of the arms may also be utilized to assist in driving through the main crank-shaft the rear wheel B' and thus propel the machine.

The shaft of the cranks F turns in bearings in a tubular bearing-case H. This case is supported upon a tubular forked bracket I, which is in turn secured by clamps J upon the steering-head K of the machine, or it may be permanently brazed thereon, if desired. This bracket I may be adjusted so as to stand either behind the line of the steering-head K, which will be its usual position for ordinary riding, or it may be turned about, so that the hand or crank shaft is in front of the line of the steering-head, which would be the position desired by riders in racing or riding at high speed.

When the bracket I is secured in front of the steering-head K, as shown in Fig. 1, the clamp J, which clasps the steering-head, has an arm L extending rearwardly, and this arm in turn has a clamp M, which is adapted to clasp the top bar N of the frame of the machine and thus steady the yoke and prevent its twisting by the strain caused by turning the cranks. From the clamp M brace-rods O extend up to the top of the yoke I and thus steady and strengthen it. These brace-rods may be secured by the bolts which hold the clamps together and the ball-bearing tubular case to the yoke, respectively. This ball-bearing case has vertical sleeves P secured to it, and these sleeves fit over the parallel upwardly-projecting arms of the yoke I. These arms of the yoke are cylindrical and screw-threaded, and nuts Q below and above the sleeves P, respectively, serve to lock the latter firmly in place upon the arms of the yoke and to also allow them to be adjusted up or down to suit requirements. Whenever the chain becomes slack, these nuts form a very convenient and accurate means for moving the shaft-bearing and the sprocket-wheel to the proper distance from the main crank-shaft, so as to give the chain for the hand driving-sprocket the proper degree of tension.

If the hand-crank shaft is to be supported in the rear of the steering-head K, the brace L is removed and a plain cap is secured to the front of the clamp J, in which case the arms I of the yoke or bracket extend upwardly and approximately parallel with the steering-head, as shown in Figs. 3 and 4.

The crank-shaft and bearing-case are secured to the bracket-arms I in the same manner as previously described. Between these arms, at a point in line with the top bar N of the frame, is a clamp R, the ends of which are secured to the vertical screw-threaded branches of the yoke I by adjusting-nuts S, and the clamp R is so adjusted as to firmly grasp the top bar N of the frame. This simplifies the device, as I am thus enabled to dispense with the supplemental braces O used in the first-named construction and make the whole structure very rigid by the two clamps J and R upon the steering-head and top frame-bar.

In order to propel the machine, the cranks are provided with any suitable or desired style of handles F', which can be readily grasped by the operator. As both hands are in use it is necessary to provide some other means for steering the machine. This consists of a light tubular bar T, the lower end of which enters the socket in the steering-head K and is clamped therein by any suitable form of clamping mechanism similar to that used for the ordinary handle-bar. A short distance above the steering-head this bar T is bent to the front at approximately right angles with the lower portion and is again bent upwardly, as shown at T', in an arc of a circle, extending to a point above that normally occupied by the rider's head. The arc of the circle is described about that point in the rider's back which forms the center of his movements when straightening up or curving the back for fast riding. The upper end of this bar is adapted to fit between the arms U of a frame which is secured to the cap or head of the rider, and is at that portion covered with rubber or other soft material to prevent undue friction against the arms U. This frame may be made by bending a single wire so as to form the forward parallel projections U, the two semicircular arcs extending on each side of the head and having the strap and buckle attached to them, so that they may be secured around the band of the cap, and two other arms extending over the top of the cap and down at the rear, where they are attached to the same strap. At the front the parts of these wires are united in any suitable manner, as shown at V, by which they are firmly kept in place.

The distance between the parallel projecting wires U is sufficient to receive the upper end of the curved arm T', and it will be seen that by this construction the mere turning of the head a little to one side or the other will be sufficient to turn the steering-bar T T' and through it to influence the wheel and perfectly steer the machine.

In order to allow for irregular movements of the machine and prevent jar or shock to the head, the end of the curved upwardly-projecting rod T' is movable up or down and out or in between the cap-rods U, so that in case of any shock, which would suddenly raise the front of the machine, there will be nothing to prevent the steering-bar from sliding upwardly between the cap-rods without producing any jar or shock upon the head of the rider, and the curvature of the part T' is such as to allow this movement to be freely made.

In order to prevent the steering-bar from slipping entirely out from between the cap-rods U, I have shown a collar W fixed upon the bar T' at a point near the upper end, so that if the head should be moved upwardly and there would be danger of disengaging the steering-bar this collar will strike the cap-rods and prevent any further upward movement of the head. By bringing the cap-rods U against this collar it allows the rider to exert a pull upward with the head and a corresponding downward pressure upon the foot-pedals. In addition to this steering device I have shown a spring mechanism by which the front fork and front wheel are normally held centrally with the remainder of the machine. This consists of an arm $a$, extending rearwardly and clamped to the steering-rod T by a clamp $b$. From the rear end of the bar $a$ a spiral spring $c$ extends, and is attached in any suitable manner to a clamp $d$, which is secured to the top bar N of the frame at such a point as to produce the necessary tension upon the spring $c$, and thus keep the steering-wheel in line with the rear wheel when not forcibly turned to one side or the other, and if it is so turned it will be instantly returned to its normal position by the action of the spring.

Having thus described my invention, what I claim as new, and desire to secure by Letters Patent, is—

1. In a bicycle, a main frame with steering and driving wheels, a crank-shaft with foot-pedals, sprocket-wheels upon the crank-shaft and rear axle respectively and a connecting driving-chain, a bracket adjustable upon the steering-head and capable of being turned to a position either in front of or behind the post, a crank-shaft journaled thereon with hand-cranks by which it is revoluble, a sprocket-wheel upon the hand-crank shaft and a corresponding one upon the pedal-crank shaft with a chain extending between the two whereby a simultaneous movement of the feet and hands may apply power to drive the machine, a vertically-extending curved bar having the lower end directly secured in the steering-head, a slotted head-piece fixed to the cap of the rider and adapted to slidably engage the upper end of the bar whereby the steering is effected by the movement of the head.

2. In a bicycle, the combination with the main frame, the wheels and driving mechanism, of supplemental hand-cranks, connecting-shaft, sprocket wheels and chain whereby the hand-cranks are connected with the foot-cranks, a forked bracket and clamp by which it is adjustably secured directly upon the steering-head, a transverse bearing for the shaft of the hand-cranks, with nuts whereby it is adjustable upon the arms of the forked bracket and a transverse clamp to be locked upon the top bar of the frame when the bracket is in place.

3. In a bicycle, a main frame with driving and steering wheels, foot and hand cranks and sprocket-wheels and connecting-chains between the two and between the foot-crank shaft and the rear driving-wheel, a forked bracket extending substantially parallel with the steering-head, having clamps by which it is adjustably secured to the steering-head and the top bar of the frame, the upwardly-projecting forks of the bracket being screw-threaded, a transverse shaft-case through which the hand-crank shaft passes and suitable bearings therein, said case having vertical sleeves fixed upon it and fitting upon the upwardly-projecting ends of the bracket with nuts above and below whereby it is adjustable independently of the attachment of the frame.

4. A steering device for bicycles, consisting of a bar having the lower end fixed in the turnable steering-post, said bar being curved horizontally to the front, thence having an upward curvature essentially in the line of motion of the rider's head as he moves into a more or less upward position, a framework and means for securing it upon the rider's head, said framework having arms projecting to the front to form a slot or channel between them between which the upper end of the steering-bar is slidable so that by turning the head, the steering post and wheel may be turned from side to side, and a collar fixed upon the upper end of the steering-bar to prevent it being drawn out from between the sides of the slotted head-piece.

In witness whereof I have hereunto set my hand.

HENRY B. TRICKLER.

Witnesses:
S. H. NOURSE,
JESSIE C. BRODIE.